US012647389B2

(12) United States Patent

Banič et al.

(10) Patent No.: US 12,647,389 B2

(45) Date of Patent: Jun. 2, 2026

(54) FORCING USE OF STREAMING METER AS ALTERNATE GATEWAY TO FACILITATE MEDIA-EXPOSURE MEASUREMENT

(71) Applicant: The Nielsen Company (US), LLC, New York, NY (US)

(72) Inventors: Ignac Banič, Ziri (SI); Jernej Mihelj, Koper (SI); Peter Šik, Izola (SI); Julio Cesar Villasante, Tampa, FL (US); Marko Panger, Škofije (SI)

(73) Assignee: The Nielsen Company (US), LLC, New York, NY (US)

( * ) Notice: Subject to any disclaimer, the term of this patent is extended or adjusted under 35 U.S.C. 154(b) by 117 days.

(21) Appl. No.: 18/824,108

(22) Filed: Sep. 4, 2024

(65) Prior Publication Data

US 2025/0080494 A1 Mar. 6, 2025

Related U.S. Application Data

(60) Provisional application No. 63/668,658, filed on Jul. 8, 2024, provisional application No. 63/580,652, filed on Sep. 5, 2023.

(51) Int. Cl.
*G06F 15/16* (2006.01)
*H04L 12/66* (2006.01)
(Continued)

(52) U.S. Cl.
CPC .......... *H04L 61/5014* (2022.05); *H04L 12/66* (2013.01); *H04L 61/103* (2013.01); *H04L 61/5053* (2022.05)

(58) Field of Classification Search
CPC . H04L 61/5014; H04L 61/5053; H04L 12/66; H04L 61/103
See application file for complete search history.

(56) References Cited

U.S. PATENT DOCUMENTS

2005/0286518 A1* 12/2005 Park ........................ H04L 61/59
370/389
2013/0205022 A1* 8/2013 Kagan ..................... H04L 67/56
709/224
(Continued)

OTHER PUBLICATIONS

International Search Report and Written Opinion from International Application No. PCT/US2024/045104, dated Dec. 9, 2024.
(Continued)

*Primary Examiner* — Normin Abedin
(74) *Attorney, Agent, or Firm* — McDonnell Boehnen Hulbert & Berghoff LLP

(57) ABSTRACT

A method and system to facilitate measuring of media exposure. An example method comprises a streaming meter on a LAN configuring a host device on the LAN to use the streaming meter as a default gateway of the host device, including the streaming meter acquiring assignment from a router on the LAN of all IP addresses assignable by the router, to prevent the router from functioning as a DHCP server for the host device, and the streaming meter then responding to DHCP messaging from the host device to assign an IP address to the host device and set the host device to use the streaming meter as the default gateway of the host device. In the example method, the streaming meter then monitors network traffic of the host device that flows through the streaming meter and reports the monitored network traffic to a media-measurement platform to facilitate media-exposure measurement.

22 Claims, 4 Drawing Sheets

(51) Int. Cl.

| | | |
|---|---|---|
| *H04L 61/103* | (2022.01) | |
| *H04L 61/5014* | (2022.01) | |
| *H04L 61/5053* | (2022.01) | |

(56) References Cited

U.S. PATENT DOCUMENTS

| | | | |
|---|---|---|---|
| 2019/0021005 A1 | 1/2019 | Stan et al. | |
| 2020/0036718 A1 | 1/2020 | Sodah | |
| 2022/0264317 A1* | 8/2022 | Kljun | H04W 8/005 |
| 2023/0073354 A1 | 3/2023 | Papakostas et al. | |
| 2023/0367833 A1* | 11/2023 | Kol | G06F 16/958 |

OTHER PUBLICATIONS

GeeksforGeeks, "DHCP Starvation Attack," printed from the World Wide Web, https://www.geeksforgeeks.org/dhcp-starvation-attack/, dated Jul. 22, 2022.
"IPv6 RA Guard," printed from the World Wide Web, https://networklessons.com/cisco/ccie-routing-switching-written/ipv6-ra-guard, printed Jul. 1, 2024.
Juniper Networks, "Understanding IPV6 Router Advertisement Guard," printed from the World Wide Web, https://www.juniper.net/documentation/us/en/software/junos/security-services/topics/concept/port-security-ra-guard.html, dated Nov. 24, 2023.

* cited by examiner

Figure 3:
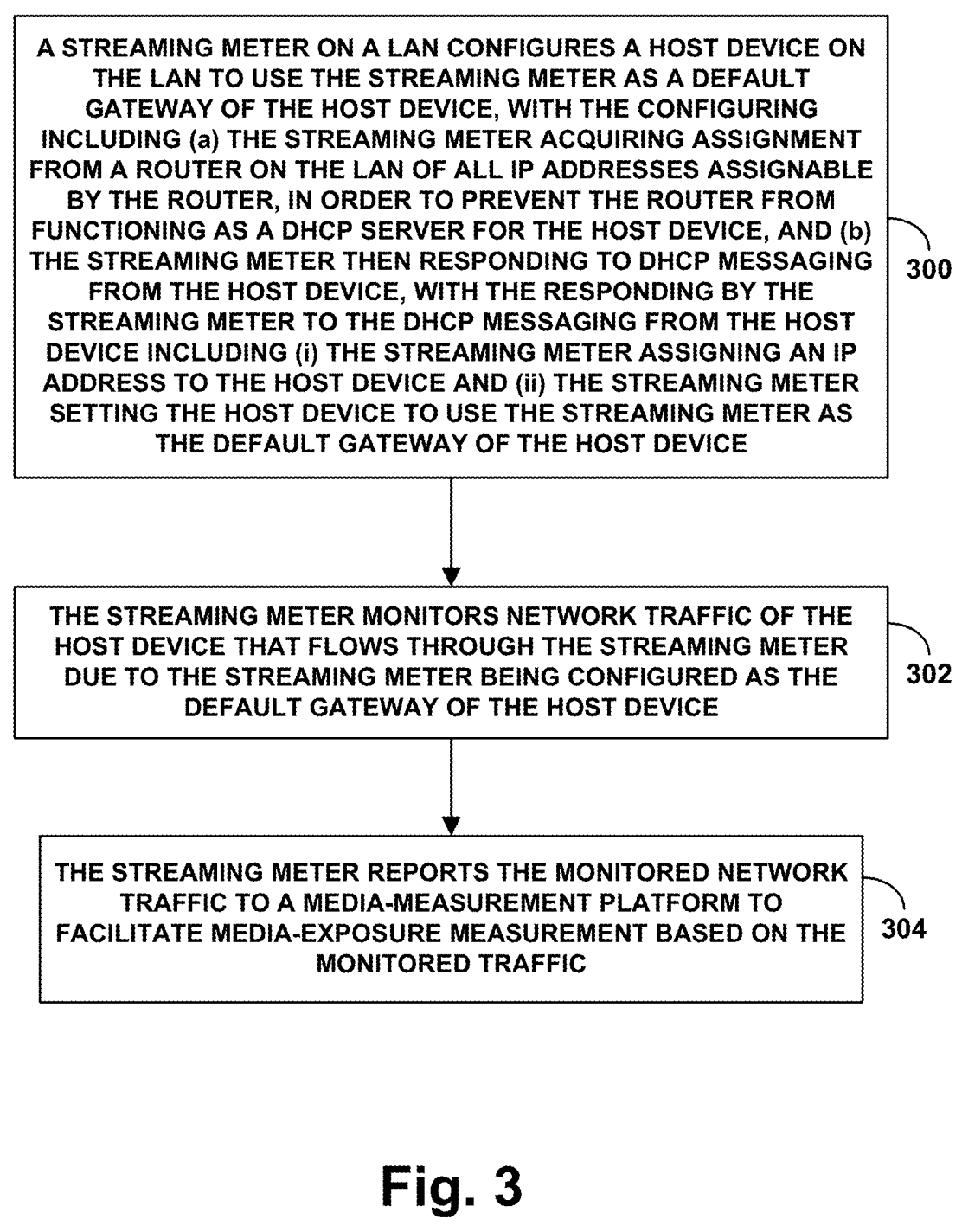

A STREAMING METER ON A LAN CONFIGURES A HOST DEVICE ON THE LAN TO USE THE STREAMING METER AS A DEFAULT GATEWAY OF THE HOST DEVICE, WITH THE CONFIGURING INCLUDING (a) THE STREAMING METER ACQUIRING ASSIGNMENT FROM A ROUTER ON THE LAN OF ALL IP ADDRESSES ASSIGNABLE BY THE ROUTER, IN ORDER TO PREVENT THE ROUTER FROM FUNCTIONING AS A DHCP SERVER FOR THE HOST DEVICE, AND (b) THE STREAMING METER THEN RESPONDING TO DHCP MESSAGING FROM THE HOST DEVICE, WITH THE RESPONDING BY THE STREAMING METER TO THE DHCP MESSAGING FROM THE HOST DEVICE INCLUDING (i) THE STREAMING METER ASSIGNING AN IP ADDRESS TO THE HOST DEVICE AND (ii) THE STREAMING METER SETTING THE HOST DEVICE TO USE THE STREAMING METER AS THE DEFAULT GATEWAY OF THE HOST DEVICE

300

THE STREAMING METER MONITORS NETWORK TRAFFIC OF THE HOST DEVICE THAT FLOWS THROUGH THE STREAMING METER DUE TO THE STREAMING METER BEING CONFIGURED AS THE DEFAULT GATEWAY OF THE HOST DEVICE

302

THE STREAMING METER REPORTS THE MONITORED NETWORK TRAFFIC TO A MEDIA-MEASUREMENT PLATFORM TO FACILITATE MEDIA-EXPOSURE MEASUREMENT BASED ON THE MONITORED TRAFFIC

Figure 4:
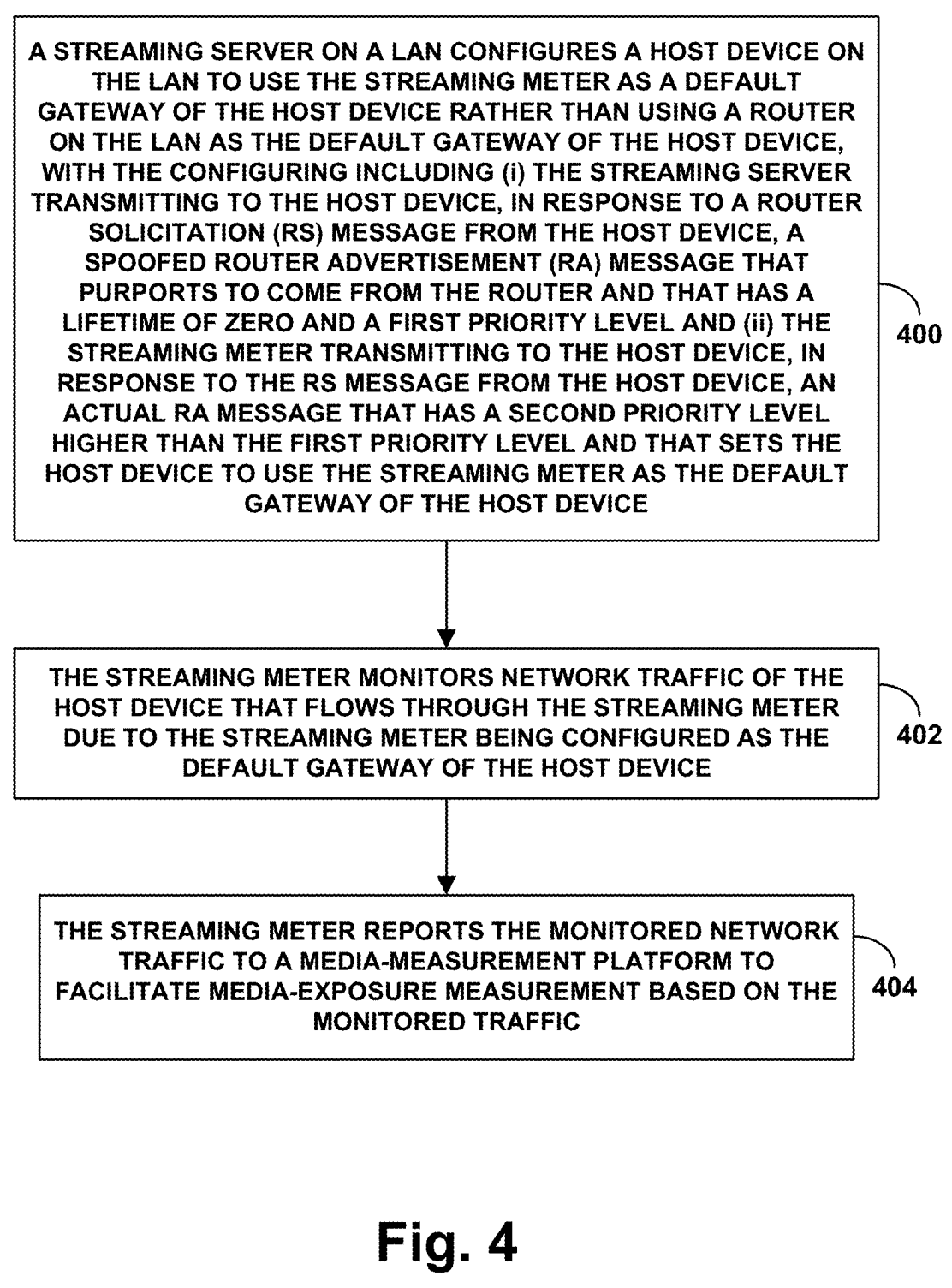

A STREAMING SERVER ON A LAN CONFIGURES A HOST DEVICE ON THE LAN TO USE THE STREAMING METER AS A DEFAULT GATEWAY OF THE HOST DEVICE RATHER THAN USING A ROUTER ON THE LAN AS THE DEFAULT GATEWAY OF THE HOST DEVICE, WITH THE CONFIGURING INCLUDING (i) THE STREAMING SERVER TRANSMITTING TO THE HOST DEVICE, IN RESPONSE TO A ROUTER SOLICITATION (RS) MESSAGE FROM THE HOST DEVICE, A SPOOFED ROUTER ADVERTISEMENT (RA) MESSAGE THAT PURPORTS TO COME FROM THE ROUTER AND THAT HAS A LIFETIME OF ZERO AND A FIRST PRIORITY LEVEL AND (ii) THE STREAMING METER TRANSMITTING TO THE HOST DEVICE, IN RESPONSE TO THE RS MESSAGE FROM THE HOST DEVICE, AN ACTUAL RA MESSAGE THAT HAS A SECOND PRIORITY LEVEL HIGHER THAN THE FIRST PRIORITY LEVEL AND THAT SETS THE HOST DEVICE TO USE THE STREAMING METER AS THE DEFAULT GATEWAY OF THE HOST DEVICE

400

THE STREAMING METER MONITORS NETWORK TRAFFIC OF THE HOST DEVICE THAT FLOWS THROUGH THE STREAMING METER DUE TO THE STREAMING METER BEING CONFIGURED AS THE DEFAULT GATEWAY OF THE HOST DEVICE

402

THE STREAMING METER REPORTS THE MONITORED NETWORK TRAFFIC TO A MEDIA-MEASUREMENT PLATFORM TO FACILITATE MEDIA-EXPOSURE MEASUREMENT BASED ON THE MONITORED TRAFFIC

FORCING USE OF STREAMING METER AS ALTERNATE GATEWAY TO FACILITATE MEDIA-EXPOSURE MEASUREMENT

REFERENCE TO RELATED APPLICATIONS

This application claims priority to U.S. Provisional Patent Application No. 63/580,652, filed Sep. 5, 2023, and U.S. Provisional Patent Application No. 63/668,658, filed Jul. 8, 2024, the entirety of each of which is hereby incorporated by reference.

SUMMARY

In order to measure the extent to which people of various demographics engage with and/or are otherwise exposed to media content (e.g., linear broadcast content, streaming media content, websites, applications, etc.), a media-measurement company can arrange to have monitoring devices or "meters" operate in representative households or other sites. People who have their media exposure monitored may be considered "panelists," and the places where the monitoring occurs, such as home, offices, or other premises, may be considered "panelist sites." Panelists may opt into and thus consent to this monitoring.

Meters can take various forms, including for instance (i) "presentation meters," which may be configured to monitor presentation or playing of media by media-presentation devices such as televisions, computers, tablets, phones, gaming devices, smart speakers, radios, streaming-media players, set top boxes, and audio-visual receivers, and (ii) "streaming meters" (i.e., network-traffic meters), which may be configured to monitor network traffic such as but not limited to streaming-media-related traffic and web browsing traffic.

At each of various panelist sites having a media-presentation device, for example, the media-measurement company may arrange for a presentation meter to monitor media presentation by that device and to generate query signature data representing the presented media. Further, the media-measurement company may operate a back-end, cloud-based computing system, to receive and evaluate this presentation-meter-generated query signature data, in order to identify the media presented at the panelist site and thereby to establish associated media-exposure data.

By evaluating an audio line feed into the media-presentation device and/or by evaluating associated acoustic speaker output, a representative presentation meter at a panelist site may be configured to detect and extract watermarked identification codes from the audio and/or to generate digital audio fingerprint data representing the audio, and to report the identification codes and/or fingerprint data, along with associated timestamps, as query signature data to the computing system for analysis. Such a presentation meter may also be configured to detect the power on or off state of the media-presentation device, so that the presentation meter can limit its media-presentation monitoring to times when the media-presentation device is on and therefore likely presenting media content being delivered to the media-presentation device.

The back-end computing system may then be configured to refer to reference signature data that maps various identification codes and/or fingerprint data to known media content items, in order to determine, based on the presentation-meter-reported identification codes and/or fingerprint data, what media content the media-presentation device was presenting at the indicated time. In particular, the computing system may be configured to search through the reference signature data in an effort to find reference signature data that matches the reported query signature data and, upon finding a match with sufficient certainty, to conclude that media content represented by the query signature data is the media associated with the matching reference signature data, and to establish associated media-presentation records for the panelist site, thus crediting the identified media content as being presented at the panelist site (e.g., as panelist-credited content).

Further, the computing system may be configured to correlate these media-presentation records with pre-stored demographics of the panelist and/or panelist site at issue, in order to establish associated media-exposure data, and the computing system may be configured to use this media-exposure data from multiple panelist sites as a basis to establish ratings statistics that may facilitate commercial processes such as ad placement and other content delivery.

In addition, at each of various panelist sites having a local area network (LAN) or otherwise supporting packet-based network communication, the media-measurement company may arrange for a streaming meter to monitor and report information about network traffic at the panelist site. Without limitation, this network traffic may include streaming-media-related traffic such as streaming-media control communications and ongoing streaming-media sessions. Further, this network traffic may take additional forms as well, such as web-browsing traffic and other interaction with online or other network resources.

Monitoring streaming-media-related traffic in particular may help to facilitate media measurement (e.g., audience measurement) related to media streaming from by Over The Top (OTT) streaming-media service providers. For instance, when query signature data provided by a presentation meter matches reference signature data representing non-linear streaming-media content and the computing system therefore credits that streaming-media content as having been presented at the panelist site, it may also be useful for the computing system to identify the source of that streaming-media content. Including this source information as part of the media-exposure data may enhance the data and associated ratings statistics and may facilitate useful action keyed to the source. For instance, knowledge that panelists (e.g., of particular demographics) have been exposed to content provided by a particular OTT service provider may support a decision to arrange for that OTT service provider to distribute particular ads and/or other content, among other possibilities.

Similarly, monitoring other sorts of network traffic at a panelist site may also help to provide and/or enhance media-exposure measurement. For instance, it may be useful to monitor the extent to which network traffic flows between the panelist site and various web sites, web apps, or other online resources. Knowledge that panelists (e.g., of particular demographics) have visited particular websites and/or have otherwise engaged with particular network resources may similarly support ad-placement decisions or the like.

To facilitate monitoring network traffic at a panelist site, it would be useful to situate the streaming meter within a network communication path through which traffic of interest would flow, so that the streaming meter would have a view of that traffic. In an example implementation, the traffic of interest may include packet-based internet communications to and/or from a given media-presentation device (such as one of those noted above) or other host device at the panelist site. Therefore, it may be useful to situate the streaming meter within a network communication path through which those internet communications would flow at the panelist site.

If a representative host sits as a node on a panelist-site LAN and engages in internet communications through that LAN, one way to situate the streaming meter in that host's network communication path would be to similarly provide the streaming meter as node on the panelist-site LAN and to have the host's internet traffic flow through that streaming meter node. In practice, the streaming meter could be provided as a dedicated streaming-meter device connected as a node on the LAN or could be embedded as software or the like in another device that is connected as a node on the LAN. Further, in some implementations, the streaming meter could be integrated with a presentation meter, as a single device for instance, situated to both monitor media presentation and monitor network traffic.

A technical issue, however, is that merely providing the streaming meter as a node on the same LAN as the host would not necessarily cause internet traffic to and/or from the host to flow through the streaming meter, so the streaming meter would not necessarily have a view of that traffic and therefore may not be able to reliably monitor the traffic to facilitate associated media measurement. In particular, the technical issue here may be that the LAN may separately have a gateway (GW) (e.g., network router) through which internet traffic to and from LAN nodes is set to be routed, and internet traffic to/from the host may therefore pass through that GW but would not necessarily pass through the streaming meter.

The present disclosure provides technical solutions to help cause network traffic to and/or from a host to pass through a streaming meter and thereby to facilitate associated media measurement.

In particular, the disclosure provides processes for causing the host to use the streaming meter as a replacement or alternate gateway through which to route the host's traffic. The disclosure assumes that the LAN has a GW in place to serve nodes on the LAN, and that the GW would engage in signaling to facilitate having traffic of those nodes be routed through the GW. The disclosure then provides mechanisms to cause network traffic of each of one or more hosts of interest to be routed through the streaming meter instead of or in addition to being routed through the GW, so that the streaming meter can monitor that traffic for purposes of media measurement or the like.

The disclosure provides at least two approaches for achieving this, given that there are at least two distinct versions of Internet Protocol (IP) that a LAN (e.g., the GW and host devices) may be set to use. One disclosed approach is well suited for use in a LAN set to use IPv4 but may apply in other contexts as well. Whereas another disclosed approach is well suited for use in a LAN set to use IPv6 but may similarly apply in other contexts as well. It may also be worthwhile to implement both approaches to help cover bases under both IPv4 and IPV6, among other possibilities. Further, each of these approaches could be conveniently implemented by the streaming meter.

With IPv4 or other arrangements, a useful approach is for the streaming meter to engage in Dynamic Host Control Protocol (DHCP) starvation of the GW in order to prevent the GW from assigning IP addresses that would be anchored at the GW, and for the streaming meter implement a DHCP server of its own to assign IP addresses that would be anchored at the streaming meter, so that the host's traffic will then flow through the streaming meter, thereby facilitating metering streaming-meter monitoring of the traffic.

In implementing this approach, the streaming meter could apply a number of useful techniques. For instance, before engaging in the DHCP starvation, the streaming meter could engage in Address Resolution Protocol (ARP) signaling to identify each IP address currently assigned by the GW and could engage in DHCP signaling to cause the GW to release each identified IP-address assignment. Further, to help avoid associated packet loss, the streaming meter could expedite the DHCP starvation process by forgoing DHCP discovery and proceeding directly to DHCP requesting. Still further, to help avoid packet-routing-inefficiency during the time between when the streaming meter engages in DHCP starvation and the time when a host then gets an IP-address assignment from the streaming meter, the streaming meter could also engage in an ARP signaling to update an ARP table at the GW so that, during that time, as the GW receives inbound packets destined to the host's GW-assigned IP address, the GW will route those packets to the host rather than to the streaming meter. Alternatively or additionally, the streaming meter could use a DHCP-relay method, to cause packets that are destined to a host's GW-assigned IP address to be routed to the streaming meter. Moreover, to help mitigate an internet outage that may result from the streaming meter being disconnected or otherwise failing, the streaming meter could set a minimum lifetime (e.g., 2 minutes) for each IP address that the streaming meter assigns.

With IPv6 or other arrangements, on the other hand, a useful approach is for the streaming meter to engage in Router Advertisement (RA) messaging to cause a host of interest to use the streaming meter as the host's default gateway and to denounce an RA message sent from the GW and thus undo associated settings established by the GW. In particular, the streaming meter could respond to a Router Solicitation (RS) message from the host and/or to a RA message sent by the GW by both (i) sending its own RA message configured to cause the host to use the streaming meter as the host's default gateway and perhaps further as the host's default Domain Name Server (DNS) and (ii) also sending a spoofed RA message configured to denounce the GW's RA message and thus to undo associated settings that the GW's RA message sought to establish.

As with the IPv4 implementation, this process could thus have the effect of causing the host's traffic to flow through the streaming meter, to facilitate streaming-meter monitoring of the traffic. Further, this process could also have the effect of causing the host's DNS queries to flow through the streaming meter, which could further facilitate streaming-meter monitoring of domains with which the host seeks to communicate, also useful for media measurement.

In implementing this approach, the streaming meter can also apply a number of useful techniques. For instance, the streaming meter could set a priority level of options in its RA message to be a highest possible level and could set a priority level of options in its spoofed RA message to be a lowest possible level. Further, the streaming meter could set a lifetime of its spoofed RA message, and perhaps the lifetime of individual options (e.g., DNS settings) in its spoofed RA message, to zero or another value that is low enough to quickly denounce the GW's RA message and associated settings. Still further, the streaming meter could send its spoofed RA message fast enough to have the host receive the spoofed RA message before the host engages in stateless DHCP acquisition of DNS settings if the GW's RA message causes the host to do so.

These as well as other aspects, advantages, and alternatives, will become apparent to those of ordinary skill in the art by reading the following detailed description, with reference where appropriate to the accompanying drawings. Further, it should be understood that the disclosure provided in this summary and elsewhere in this document is provided by way of example only and that numerous variations and other examples may be possible as well.

BRIEF DESCRIPTION OF THE DRAWINGS

FIG. 3 is a flow chart illustrating an example method.

FIG. 4 is a flow chart illustrating another example method.

DETAILED DESCRIPTION

The present disclosure will discuss example implementation in relation to a panelist's home where there are one or more media presentation devices such as any of those noted above for instance. In this arrangement, the panelist may be a resident of the home and may be registered as a panelist with a media-measurement company, opting in and thus consenting to media monitoring to facilitate media measurement for instance. It will be understood, however, that the disclosed principles could apply as well in other contexts, such as at other panelist sites, among other possibilities.

Further, it will be understood that arrangements and processes disclosed herein could take various other forms. For instance, elements and operations could be re-ordered, distributed, replicated, combined, omitted, added, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units executing program instructions stored in memory, among other possibilities.

Figure 1:
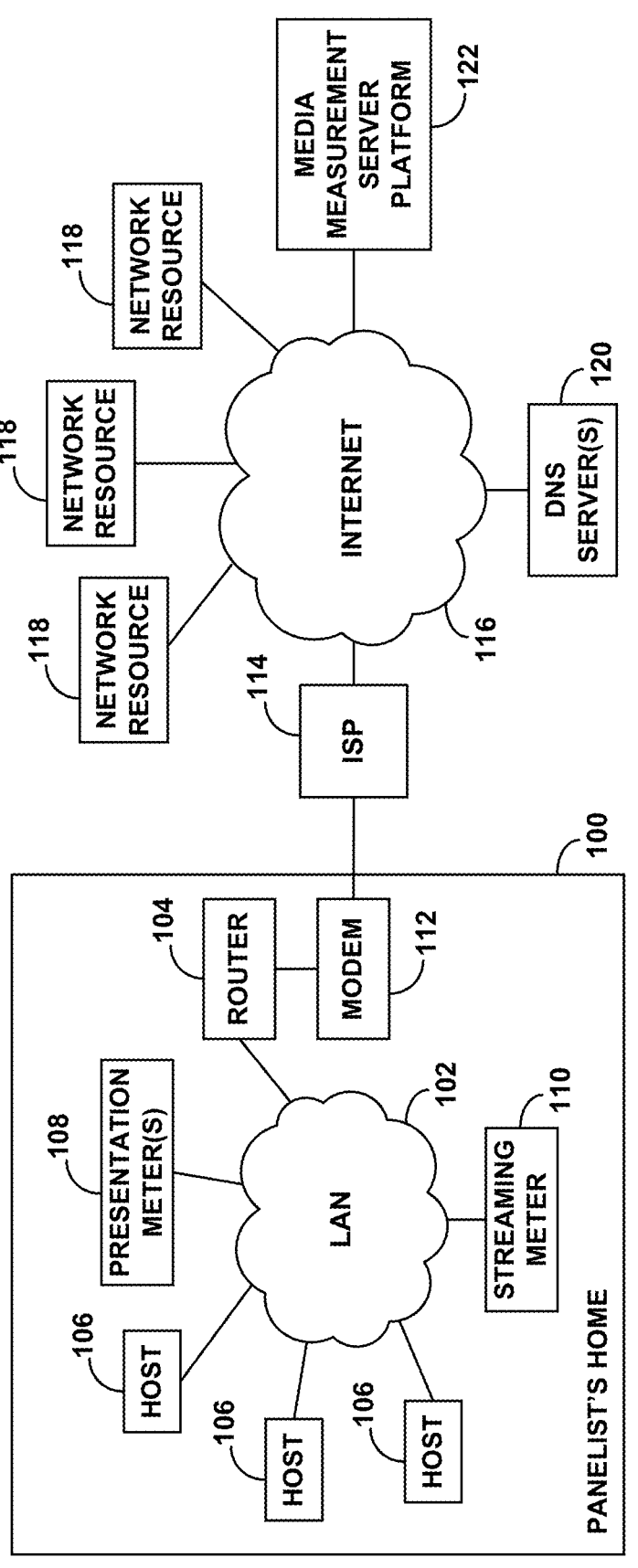
FIG. 1 is a simplified block diagram of an example arrangement in which disclosed features could be implemented.

Referring to the drawings, as noted above, FIG. 1 is a simplified diagram of an example arrangement in which various disclosed features could be implemented. In particular, FIG. 1 depicts at a panelist's home 100 an example packet-switched LAN 102 having a number of LAN nodes including but not limited to a household router 104, one or more hosts of interest (e.g., media presentation devices) 106, one or more presentation meters 108, and an example streaming meter 110. These nodes may be connected to the LAN through wired (e.g., Ethernet) and/or wireless (e.g., Wi-Fi) links. Further, as noted above, the streaming meter 110 could be provided as a separate device or alternatively as logic within another device, possibly integrated with a presentation meter 108 for instance.

As shown, the router 104 is connected with a modem 112, which provides connectivity with an internet service provider (ISP) 114, to facilitate communication on the internet 116. Alternatively, the router 104 may be integrated with the modem 112.

Shown accessible through the internet 116 (e.g., at particular public IP addresses on the internet) are then multiple network resources 118 such as streaming-media servers, web servers, application servers, etc., and one or more DNS servers 120. Further, also shown accessible through the internet 116 is a media-measurement server platform 122, which may be operated by an example media-measurement company.

Each of the nodes on the LAN may have a permanent or semi-permanent hardware address, typically a Media Access Control (MAC) address assigned to a network interface of the node during manufacturing. A MAC address may be a 12-digit hexadecimal number that uniquely identifies a network interface card of the node, typically expressed as sequence of six 2-digit values, such as XX: XX: XX: XX: XX: XX. A node's MAC address may include a prefix keyed to the node's manufacturer and thus possibly indicating a brand of the node, and the node's MAC address might also include one more components corresponding with the node's model or other such information.

Further, each node on the LAN may have a respective IP address that is unique in the context of the LAN. These IP addresses may take various forms and may be assigned or established in various ways depending on the version of IP in use.

In practice, to communicate a block of data in the LAN from a first node having a source IP address and source MAC address to a second node having a destination IP address and destination MAC address, the first node could process the data downward through layers of a protocol stack culminating with output on a physical layer defining the physical transmission channel between the first node and the second node, and the second node may then receive the data on the physical layer and process the data upward through a corresponding protocol stack.

After processing the data through application and transport layers, for instance, the first node may generate at a network layer an IP packet that contains the data and has an IP header specifying the source and destination IP addresses, and the first node may pass that IP packet down to a data-link layer, where the first node may then generate an Ethernet frame (or Ethernet packet) by adding to the IP packet an Ethernet header that specifies the source and destination MAC addresses. (If the IP packet is longer than a maximum size for an Ethernet frame, the IP packet may be fragmented and each fragment could be encapsulated in a respective Ethernet frame.) The first node may then output that Ethernet frame on the physical layer where it would be routed per its Ethernet header from the source MAC address of the first node to the destination MAC address of the second node. Upon receipt of this Ethernet frame by the second node, the second node may then strip the Ethernet header at a data-link layer to uncover the IP packet and then strip the IP header at the network layer, and may then engage in further processing at the transport and application layers to uncover the transmitted data.

To facilitate this packet routing, the LAN nodes may support use of a protocol to translate IP addresses to MAC addresses. This protocol may differ depending on the version of IP in use. With IPv4, for instance, the nodes may use ARP to translate IP addresses to MAC addresses and may further build and maintain an ARP cache that maps IP addresses to MAC addresses. Whereas, with IPv6, the nodes may use Neighbor Discovery Protocol (NDP) to translate IP addresses to MAC addresses and may further build and maintain an NDP cache that maps IP addresses to MAC addresses.

Figure 2:
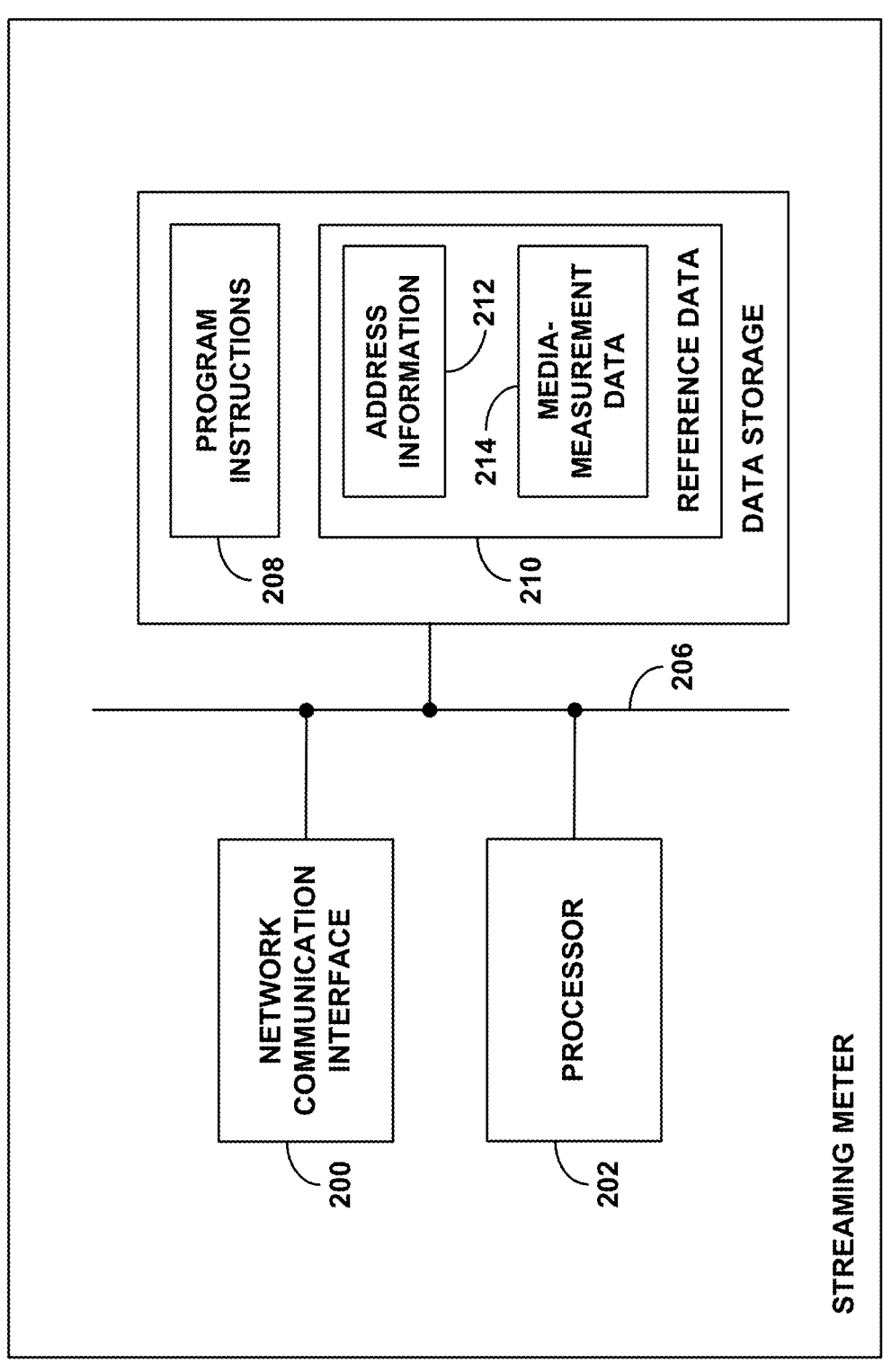
FIG. 2 is a simplified block diagram of a streaming meter as an example computing system that could carry out various disclosed operations.

FIG. 2 is next a simplified block diagram of the example streaming meter 110, showing some of the components that could be included in the streaming meter as an example computing system configured to carry out various disclosed operations. (In alternative implementations, the computing system that carries out these operations may take other forms as well.) As shown in FIG. 2, the example streaming meter 110 includes a network communication interface 200, at least one processor 202, and non-transitory data storage 204, which could be integrated together and/or interconnected by a system bus or other connection mechanism 206.

The network communication interface 200 could enable the streaming meter to communicate on a packet-switched network such as LAN 102, which may in turn facilitate communication on the internet 116 or other wide area network. As such, the network communication interface 200 could comprise one or more wired Ethernet network interface modules and/or one or more wireless network interface modules such Wi-Fi modules, among other possibilities, including physical hardware and associated processing logic.

The at least one processor 202 could comprise one or more general purpose processors (e.g., microprocessors) and/or one or more special purpose processors (e.g., digital signal processors (DSPs), application specific integrated circuits (ASICs), etc.) Further, the non-transitory data storage 204 could comprise one or more volatile and/or non-volatile storage components (e.g., flash, optical, magnetic, ROM, RAM, EPROM, EEPROM, etc.), and may be integrated in whole or in part with the at least one processor 202.

The non-transitory data storage 204 could then store program instructions 208 and reference data 210.

The program instructions 208 could be executable by the at least one processor 202 to carry out various streaming-meter operations, including those described here. Some of these program instructions could be loaded into the non-transitory data storage 204 at the time of manufacture of the streaming meter 110 and/or later as an update of the streaming meter. Further, some program instructions may be hard coded in the streaming meter 110.

The reference data 210 could comprise data useable by the processor 202 in or to facilitate carrying out the streaming-meter operations. For instance, the reference data 210 may include address information 212 for various other nodes on the LAN 102, such as information about IP addresses and MAC addresses of the other nodes, as well as addresses of the 120 and the media-measurement server platform 122. Further, the reference data 210 may include media-measurement data 214 such as information that the streaming meter has gathered by its monitoring of LAN traffic, to facilitate reporting to the media-measurement server platform 122 for establishment of audience ratings data or the like.

In line with the discussion above, the present disclosure provides approaches for configuring the streaming meter 110 to operate as an alternate gateway for one or more representative hosts, i.e., as a gateway through which LAN traffic of each such host would flow, in addition to or instead of the traffic flowing through the household router 104, so that the streaming meter can monitor that network traffic to facilitate reporting to the media-measurement server platform 122.

As indicated above, one example approach is well suited for use with IPv4 and possibly in other contexts, and another example approach is well suited for use with IPV6 and possibly in other contexts. The following subsections will walk through example implementation of each approach. It will be understood that numerous variations are possible as well.

Note that in these or other implementations, the streaming meter 110 may implement safeguards to protect user privacy. In addition to panelists opting in as noted above, for instance, the streaming meter 110 may process just metadata (e.g., packet headers, DNS queries, etc.) rather than tracking content consumption and other activity. Further, the streaming meter may encrypt data both for transmission and storage. And the streaming meter may scramble private data.

Forcing Use of Streaming Meter as Alternate Gateway with IPv4

In a LAN where nodes are configured to operate with IPv4, each node on the LAN may have a respective IP address in an IPv4 format, including a network prefix identifying the network (e.g., subnet) and host number uniquely identifying the node within that network. IPv4 addresses are typically written in dotted decimal form as four 8-bit fields separated by periods (e.g., x.x.x.x), with one or more of the fields identifying the network and one or more remaining fields identifying the host.

In the example arrangement of FIG. 1, the household router 104 may have a statically defined IP address on the LAN 102 and may also operate as a DHCP server to dynamically assign unique IP addresses on the LAN 102 to the other nodes on the LAN. For this purpose, the router 104 may be configured to manage a defined pool of IP addresses and to dynamically assign IP addresses selected from that pool. For instance, if the router's IP address is 192.168.1.1, the router 104 may be set to dynamically assign IP addresses in the range 192.168.1.2 through 192.168.1.255, among other possibilities.

The router 104 may maintain a DHCP table that specifies each assigned IP address and maps each assigned IP address to the MAC address of the node to which the IP address is assigned. Further, the router 104 may also maintain an ARP cache (ARP table) as noted above and may update the ARP table each time the router 104 makes a change to its DHCP table or otherwise learns of a new IP-MAC correlation.

The DHCP address assignment process is known as "DORA," as it includes the following sequence of DHCP messages: (i) Discover, (ii) Offer, (iii) Request, and (iv) Acknowledge. When a node gets enabled on the IPV4 LAN (e.g., connected and powered on), the node may broadcast a DHCP DISCOVER message by transmitting it with a broadcast destination IP address (e.g., 255.255.255.255) and with a broadcast destination MAC address (e.g., ff:ff:ff:ff:ff:ff), specifying the node's MAC address as source MAC address and a generic IP address (e.g., 0.0.0.0) as the source address. The DHCP server of the router 104 may then respond to this DHCP DISCOVER message by a DHCP OFFER message indicating its existence as a DHCP server. The DHCP server may transmit this DHCP OFFER message as a unicast or broadcast transmission, with the router's IP address as source IP address and the router's MAC address as source MAC address.

In response to the DHCP OFFER message, the node may then transmit (e.g., broadcast, or unicast to the router 104) a DHCP REQUEST message, with a generic source IP address, and with the node's MAC address as source MAC address. And the DHCP server may then assign an IP address to the node and may respond to the node (e.g., broadcast, or unicast to the node) with a DHCP ACK (acknowledgement) message specifying the assigned IP address and a designated lifetime for the IP-address assignment or "lease", with the router's IP address as source IP address, and the router's MAC address as source MAC address. Further, the router 104 may update its DHCP table accordingly, specifying the assigned IP address and corresponding MAC address of the node.

Note also that the DHCP OFFER message and/or the DHCP ACK message in this process may also specify certain configuration parameters for assignment to the node, particularly (i) the IP address of the router 104 as a default-gateway address for the node and (ii) one or more DNS server addresses for use by the node. Upon receipt of the DHCP OFFER message and/or the DHCP ACK message, the node may thus configure itself with the specified configuration parameters.

For instance, the node may configure itself to use the specified default-gateway address of the router 104 for the node's packet-data communications on the internet 116. This use of the router 104 as the node's default gateway may include the node transmitting outbound packets to the router 104, the router 104 applying network address translation (NAT) to map the node's IP address on the LAN to the router's public IP address, and the router 104 forwarding those outbound packets via the modem for transmission to their destinations on the internet 116. Further, this use of the router 104 may then also include the router 104 receiving from the internet inbound packets that are destined to the node, applying NAT to translate destination IP addresses of those packets to the local IP address of the node, and forwarding those packets on the LAN to the node.

Further, the node may configure itself to use the specified DNS address(es) for translating domain names to IP addresses so as to facilitate addressing outbound packets. Thus, per the configuration, when the node has a communication to send to a given domain on the internet 116, the node could send a DNS query to such a specified DNS address to translate the domain to a public IP address and could then transmit the communication to that public IP address.

Further, as noted, each IP-address lease may have a designated lifetime value, which may be a finite duration such as a number of minutes, hours, or days. Normally at some point before expiration of that lifetime, the node may transmit to the DHCP server at the router 104 a DHCP renew request (e.g., a new DHCP REQUEST message), in response to which the DHCP server may transmit to the node a new DHCP ACK renewing the node's IP address lease and again specifying a lease lifetime. Alternatively, if the DHCP server is unwilling or unable to renew the lease, the DHCP server could send to the node a DHCP NAK (negative acknowledgement) message, in response to which the node may then restart the DORA process.

As noted above, with IPv4, nodes may also use ARP to map IP addresses to MAC addresses. According to ARP, when a first node seeks to transmit data to a IP address of a second node, the first node may refer to its ARP cache to see if it already has a mapping that specifies the MAC address corresponding with that IP address. If not, the first node may broadcast an ARP REQUEST with a broadcast destination IP address and broadcast destination MAC address, and with the ARP REQUEST specifying (i) the source node's MAC address as "sender_hw_addr", (ii) the source node's IP address as "sender_ip_addr", and (iii) the IP address at issue as "target_ip_addr". Upon broadcast of this ARP REQUEST, the second node, which has the IP address specified as being at issue would then respond by transmitting an ARP REPLY with the first node's IP address as destination IP address and—based on the "sener_hw_addr" in the ARP REQUEST—the first node's MAC address as destination MAC address, and with the ARP REPLY specifying (i) the second node's IP address as "sender_ip_addr", (ii) the second node's MAC address as "sender_hw_addr", (iii) the first node's IP address as "target_ip_addr", and (iv) the first node's MAC address as "target_hw_addr". Thus, the first node would receive in the ARP REPLY as "sender_hw_addr" the MAC address that corresponds with the IP address of the second node.

With the LAN of FIG. 1 operating according to IPv4, normal processing as each of various nodes gets enabled on the LAN may be for each node to acquire an IP address dynamically assigned by the router 104, with the router 104 accordingly updating its DHCP and ARP tables to map the node's assigned IP address with the node's MAC address. Further, upon discovering presence of the router 104, each node may configure itself to use the router 104 as its default gateway as noted above and may also configure itself to use DNS servers as specified by the router 104.

As discussed above, the present disclosure provides for causing the streaming meter 110 to function as an alternate gateway for one or more hosts 106 on the LAN, so that the traffic of each such host 106 could flow through the streaming meter 110 and the streaming meter 110 could monitor the traffic and report accordingly to the media-measurement server platform 122 to facilitate media measurement.

To do this, the streaming meter 110 could carry out processing to help prevent the router 104 from assigning IP addresses and to undo existing router IP-address assignments, and the streaming meter 110 could itself implement a DHCP server and therefore itself assign IP addresses and configure hosts to use the streaming meter 110 as their default gateway and possibly further as a DNS server. In this way, the streaming meter 110 could inject itself as an intermediary in the host's network traffic, to facilitate media-measurement.

As the router 104 may still remain as a principal routing point in the LAN, a goal in this process may be to change the DHCP table at the router 104 so that each host's IP address gets mapped there to a MAC address of the streaming meter 110. For instance, for each host 106, the streaming meter 110 could randomly (or otherwise) generate a respective artificial MAC address of the streaming meter and could work to populate the router's DHCP table to map an IP address of that host to that artificial MAC address of the streaming meter. Further, for each IP address that the router could assign but that is not currently assigned to a host on the LAN, the streaming meter 110 could likewise generate a respective artificial MAC address of the streaming meter and could also work to populate the router's DHCP table to map the IP address to that artificial MAC address of the streaming meter. Because the streaming meter would treat these artificial MAC addresses as MAC addresses of the streaming meter, the streaming meter would be configured to monitor for and receive Ethernet frames destined to each such artificial MAC address.

To begin with, as to any IP addresses that the router 104 has already assigned, the streaming meter 110 could identify those assigned IP addresses and could cause the router 104 to release those assignments. To do this, the streaming meter 110 could broadcast an ARP REQUEST respectively for each potential IP address on the LAN, in order to identify each currently assigned IP address on the LAN. Further, for each identified IP address, the streaming meter 110 could transmit to the router 104 a DHCP RELEASE message, causing the router 104 to release the IP address assignment. (For each such identified IP address, the streaming meter 110 could delay sending this DHCP RELEASE message until a later time point when the host to which that IP address was assigned is no longer present on the LAN, in order to help circumvent any active protection that the router 104 may apply against spoofed DHCP RELEASE message.)

For each such released IP address and each other allocable IP address on the LAN, the streaming meter 110 could further cause the router 104 to assign the IP address to the streaming meter 110. Namely, for each IP address, the streaming meter 110 could send to the router 104 a DHCP REQUEST requesting assignment of that particular IP address (e.g., by including in the request a specification of that IP address) and specifying one of the streaming meter's artificial MAC addresses. The router 104 may then grant this IP address assignment, sending to the streaming meter a DHCP ACK message and accordingly updating the router's DHCP table and ARP table to map the IP address to the artificial MAC address of the streaming meter 110. Note that, to expedite this process as to each of multiple IP addresses, the streaming meter 110 could skip transmitting a DHCP DISCOVER message to the router 104 and could thus also skip receiving a DHCP OFFER message from the router 104, rather proceeding directly to transmission of a DHCP REQUEST message to the router 104. (Further, another way to help expedite this process if the streaming meter 110 sends a DHCP DISCOVER message may be for the streaming meter 110 to use the "Rapid Commit" option in that DHCP DISCOVER message.)

In an alternative implementation, the streaming meter could use a DHCP relay operation as a basis to cause the router 104 to assign to the streaming meter all allocable IP addresses. A DHCP relay, like a WiFi range extender for instance, may operate to receive and forward DHCP messages. Upon receipt of DHCP DISCOVER and DHCP REQUEST messages from hosts, for instance, the DHCP relay may forward those messages to a router but may change the source MAC address in each such message to be a MAC address of the DHCP relay, so that DHCP responses from the router would go to the DHCP relay for forwarding in turn to the hosts. For present purposes, the streaming meter 110 could pretend to be a DHCP relay from the perspective of router 104, with the streaming meter 110 sending DHCP REQUEST messages to the router 104 to request assignment of each of the allocable IP addresses, specifying the MAC address (e.g., the actual MAC address, or an artificial MAC address) of the streaming meter 110 as the source MAC address, so that responses from the router 104 will go to the streaming meter 110.

By the streaming meter 110 acquiring assignment from the router 104 of each allocable IP address in the LAN, the router 104 would have no IP addresses available to assign and would therefore not respond (e.g., positively or at all) to DHCP DISCOVER messages or DHCP REQUEST messages from the hosts 106. The streaming meter 110 may thereby starve the router 104 of its allocable IP addresses.

With this process, hosts that had IP addresses assigned by the router 104 may be unaware of this change at the router 104 and may therefore continue to use their router-assigned IP addresses until they send DHCP renew requests for those IP addresses. As each host sends to the router 104 a DHCP renew request for the host's existing IP lease, however, the router 104 would reject that DHCP renew request, since the router 104 would have that IP address already assigned to the streaming meter 110. As a result, each such host may engage in the DORA process anew. But at this point, since the router 104 has no allocable IP addresses, the router 104 would not respond to DHCP DISCOVER messages as noted above. Instead, the streaming meter's DHCP server may respond to the hosts' DHCP DISCOVER messages and engage in further DORA signaling with each host to assign to each host a respective IP address, which could be the same IP address that the router 104 had assigned to the host.

Note that in this process, when the streaming meter 110 sends to the router 104 the DHCP RELEASE message for a given IP address that was assigned to a given host, the router 104 may not respond to that release request. However, the streaming meter 110 could confirm that the DHCP RELEASE worked by the streaming meter 110 finding that the streaming meter 110 then successfully acquires assignment from the router 104 of that same IP address, and/or by the streaming meter 110 thereafter receiving from the router 104 a DHCP OFFER message offering that same IP address.

One particular technical issue that may occur in this process relates to management of the ARP table at the router 104. Namely, when the streaming meter 110 acquires assignment from the router 104 of an IP address that had been assigned to a given host, the router 104 would not only update its DHCP table to map that IP address to an artificial MAC address at the streaming meter 110 but would also then responsively update its ARP table to indicate the same mapping. As a result, for the time period before the host gets an IP assignment from the streaming meter 110, the host's outbound packets to internet 116 destinations would flow from the host to the router 104 and then out onto the internet 116. However, when the router 104 receives from the internet 116 inbound packets that are destined to the node's IP address, the router 104 would route those packets to the streaming meter 110, and the streaming meter 110 would then need to reroute those packets to the host, possibly first needing to engage in ARP signaling to determine the host's actual MAC address. This rerouting process can be relatively slow and therefore inefficient.

To help improve performance for the time period between when the streaming meter 110 has acquired assignment of an IP address that had been assigned to a host and when the host then acquires IP assignment from the streaming meter 110 instead, the streaming meter 110 could engage in processing that causes the router 104 to route more directly to the host any inbound packets that are destined to the host. Namely, the streaming meter 110 can engage in an ARP-cache-recovery process to update the router's ARP table for this period.

The ARP-cache-recovery process can involve the streaming meter 110 transmitting an ARP REQUEST that is specially configured to trigger an ARP REPLY from the host that will cause the router to update the router's ARP table so as to map (i) the IP address that the router 104 had assigned to the host to (ii) the host's actual MAC address. Namely, the streaming meter 110 can broadcast an ARP REQUEST that specifies the router 104 as the sender of the ARP REQUEST and that specifies the router-assigned IP address of the host as the IP address at issue. When the host receives this ARP REQUEST, seeing that the host has the assigned IP address at issue, the host will then respond by transmitting to the router 104, as the specified sender of the ARP request, an ARP REPLY that specifies the host's actual MAC address corresponding with the IP address at issue. Namely, the host would send this ARP REPLY to the router 104, because the ARP REQUEST had designated the router 104 as the sender of the ARP REQUEST, even though the streaming meter 110 had actually sent that ARP REQUEST. When the router 104 thus receives this ARP REPLY, even though the router 104 itself did not send the ARP REQUEST that triggered that response, the router 104 will respond to the ARP REQUEST by updating the router's ARP table to map the IP address at issue to the host's actual MAC address as indicated in the ARP REQUEST, thus fixing the ARP technical problem noted above.

In this process, the ARP REQUEST that the streaming meter 110 broadcasts could specify as the source MAC address the streaming meter's actual MAC address or, for that matter, any MAC address other than the router's MAC address so as to avoid having the router 104 drop this packet transmission (which it would do if it saw that the packet comes from the router's own MAC address). Further, the ARP REQUEST would designate the broadcast MAC address as destination MAC address. In the ARP layer of this transmission, the streaming meter 110 could specify (i) the router's MAC address as the "sender_hw_addr" and the router's IP address as "sender_ip_addr", so that the host's ARP REPLY will get directed to the router 104 and (ii) the IP address at issue as the "target_ip_addr".

The ARP REPLY from the host to the router 104 would then be a regular ARP REPLY. Namely, it would specify as the source MAC address the host's actual MAC address and as destination MAC address the router's MAC address (per "sender_hw_addr" in the ARP REQUEST). Further, in the ARP layer, this transmission would specify (i) the host's MAC address as "sender_hw_addr", (i) the host's IP address as "sender_ip_addr", (iii) the router's MAC address as "target_hw_addr", and (iv) the router's IP address as "target_ip_addr".

Note that, once the streaming meter 110 then itself assigns an IP address to the host, the streaming meter 110 would then function as the host's default gateway. At that point, when the host sends outbound packets destined to addresses on the internet 116, the host would send those packets to the streaming meter 110, and the streaming meter 110 would perform NAT and forward those packets on to the router 104, and the router 104 may view those packets as having been sent by the streaming meter 110. Thus, when the router 104 receives from the internet 116 associated inbound packets, the router 104 would route those packets to the streaming meter 110, and the streaming meter 110 would in turn route those packet to the host.

As presently contemplated, the streaming meter 110 may also carry out other useful techniques to help improve this overall process and to facilitate media measurement.

For example, as noted above, in the DHCP ACK that the streaming meter 110 sends to each host as part of the DORA process, the streaming meter 110 could specify one or more DNS server addresses at the streaming meter 110. For instance, the streaming meter 110 could specify its own IP address as a DNS server address or as each of multiple DNS addresses. This would have the effect of the streaming meter 110 configuring the host to direct the host's DNS queries to the streaming meter 110. The streaming meter 110 may then further be configured to forward each such DNS query to an actual DNS server address such as one specified by the router 104, and responses to those DNS queries from the actual DNS server would thus go to the streaming meter 110 and the streaming meter 110 would forward them to the querying host. As a result, the streaming meter 110 would thus be able to monitor the host's DNS queries to determine network resources (e.g., streaming media service provider domains and web server domains) with which the host communicates, and the streaming meter 110 could conveniently report this information to the media-measurement platform 122 to help bolster media measurement.

As another example, the streaming meter 110 may carry out the present process in response to the streaming meter 110 detecting that the streaming meter 110 gets enabled on the LAN. For instance, when the streaming meter 110 first gets enabled on the LAN (e.g., if/when it itself gets an IP address assignment from the router 104 and/or if/when it detects up/down link messages through its network communication interface), the streaming meter 110 may engage in the process. Further, if the streaming meter gets taken out of service (e.g., powered off or disconnected) and then gets enabled on the LAN again, the streaming meter 110 could again respond to it being enabled on the LAN by starting the process over.

As yet another example, to help minimize having hosts experience internet outages if and when the streaming meter 110 gets taken out of service, the streaming meter 110 could set to a minimum duration the lifetime of each IP address that the streaming meter 110 assigns and could also request the router 104 to set to a minimum duration the lifetime of each IP address that the router assigns in correspondence with an artificial MAC address at the streaming meter 110. For instance, if the minimum allowed lifetime is 2 minutes, the streaming meter 110 could specify that lifetime in the DHCP ACK (or possibly DHCP OFFER) in each DORA process with a host acquiring an IP address lease from the streaming meter. Further, the streaming meter 110 could also specify that minimum lifetime in the DHCP request that the streaming meter 110 sends to the router 104 to acquire an IP address lease respectively for each artificial MAC address at the streaming meter 110. Setting these IP lease durations to the minimum would result in increased DHCP renewal signaling. However, the minimum durations could help facilitate quick restoration of internet service if and when the streaming meter 110 goes out of service, as hosts may then try and fail to renew IP leases from the streaming meter 110 and then proceed to acquire IP leases from the router 104.

As still another example, the streaming meter 110 could also carry out processing to determine the DHCP pool of IP addresses that were allocable by the router 104 on the LAN, so that the streaming meter 110 could then assign IP addresses from the pool to any newly enabled hosts on the LAN. For instance, possibly as part of the DHCP starvation process or separately, the streaming meter 110 could send to the router 104 a DHCP REQUEST respectively for each possible IP address on the LAN subnet and could build a DHCP-pool table indicating that each IP address as to which the router 104 positively acknowledged the streaming meter's DHCP REQUEST is an allocable IP address (and that each other IP address, if any, is not allocable). The streaming meter 110 could then allocate IP addresses from this pool.

Further, the streaming meter 110 could help to minimize changes to the LAN by assigning to each host the same IP address that the router 104 had assigned to the host.

Still further, to account for the possibility that the router 104 may broadcast an ICMP REDIRECT message to try to get hosts to use the router 104 instead of the streaming meter 110 as their default gateway, the streaming meter 110 could engage in processing to block ICMP REDIRECT messages. For instance, through signaling with the hosts, the streaming meter 110 could direct the hosts to not route their outbound packets to the router 104.

FIG. 3 is a flow chart illustrating a method that a streaming meter could carry out in accordance with the present disclosure to facilitate measuring of media exposure, for instance with respect to an IPv4 network.

As shown in FIG. 3, at block 300, a streaming meter on a LAN could configure a host device on the LAN to use the streaming meter as a default gateway of the host device, with the configuring including (a) the streaming meter acquiring assignment from a router on the LAN of all IP addresses assignable by the router, in order to prevent the router from functioning as a DHCP server for the host device, and (b) the streaming meter then responding to DHCP messaging from the host device, with the responding by the streaming meter to the DHCP messaging from the host device including (i) the streaming meter assigning an IP address to the host device and (ii) the streaming meter setting the host device to use the streaming meter as the default gateway of the host device.

At block 302, the method then includes the streaming meter monitoring network traffic of the host device that flows through the streaming meter due to the streaming meter being configured as the default gateway of the host device. Further, at block 304, the method includes the streaming meter reporting the monitored network traffic to a media-measurement platform to facilitate media-exposure measurement based on the monitored traffic.

In line with the discussion above, the host device in this method could be a media-presentation device such as but not limited to one of those noted above.

Further, as discussed above, the act of the streaming meter acquiring assignment from the router of all IP addresses assignable by the router could include (i) identifying each of one or more IP addresses currently assigned by the router and (ii) signaling to the router to cause release of the one or more IP addresses to facilitate acquiring assignment from the router of each of the one or more IP addresses. Still further, as discussed above, the act of the streaming meter acquiring assignment from the router of all IP addresses assignable by the router could result in updating at the router of a DHCP table to map each assignable IP address to a respective artificial MAC address at the streaming meter.

As additionally discussed above, the DHCP messaging from the host device could include a DHCP DISCOVER message transmitted by the host device, to which the router would not respond due to the streaming meter having acquired assignment from the router of all IP addresses assignable by the router.

Further, as discussed above, the act of the streaming meter acquiring assignment from the router of all IP addresses assignable by the router could include the streaming meter acquiring assignment from the router of a given IP address that the router had assigned to the host device. And in that case, the streaming meter could engage in DHCP signaling with the router to cause the router to release assignment of the given IP address from the host device and could then acquire assignment from the router of the given IP address.

Still further, as discussed above, after the streaming meter engages in this DHCP signaling with the router to cause the router to release assignment of the given IP address from the host device, and before the streaming meter assigns an IP address to the host device and sets the host device to use the streaming meter as the default gateway of the host device, the streaming meter could update an ARP table at the router to map the given IP address to a MAC address of the host device. For instance, the streaming meter could broadcast an ARP REQUEST that requests a MAC address corresponding with the given IP address and that specifies the router as a sender of the ARP REQUEST, and the ARP request could cause the host device to respond to router, as the sender of the ARP request, with an ARP REPLY specifying as the MAC address corresponding with the given IP address, so that the router would accordingly update the ARP table.

As further discussed above, the act of streaming meter responding to the DHCP messaging from the host device could include the streaming meter setting the host device to use at least one DNS address at the streaming meter, in which case the monitored network traffic could include at least one DNS query.

Still further, as discussed above, the streaming meter could carry out the configuring in this method in response to the streaming meter being enabled on the LAN.

Further, as noted above, the act of the streaming meter acquiring assignment from the router of all IP addresses assignable by the router could include setting a lease-lifetime of each of the IP addresses to a minimum duration, which as noted above could help minimize issues in the event the streaming meter then gets taken out of service.

Forcing Use of Streaming Meter as Alternate Gateway with IPv6

In a LAN where nodes are configured to operate with IPV6, each node on the LAN may have a respective IP address in an IPV6 format, which may be 128 bits long and divided into groups of 16 bits each. IPv6 are typically written with the 16-bit groups represented as four-digit hexadecimal numbers separated by colons.

In accordance with IPv6, when a host gets enabled on a LAN such as that shown in FIG. 1, the host may self-configure itself with a local IP address (which it will confirm is not a duplicate), to facilitate its LAN communication. The device will then send a Router Solicitation (RS) message (multicast to an all-routers IPv6 address) seeking to learn about the presence of a router on the LAN.

In normal practice, when the host sends this RS message, the router 104 would receive the RS message and would respond to the host with a Router Advertisement (RA) message that specifies various options for the host. These options may include (i) an IPV6 address of the router 104 and a directive making the router 104 the host's default gateway through which the host will then route its packet traffic, (ii) an option-O flag that, if set, would cause the host to engage in stateless DHCPv6 to request DNS addresses from a DHCPv6 server without engaging in DHCPv6 IP address acquisition, and (iii) DNS addresses that the host should use, e.g., if the option-O flag is not set.

Thus, with this normal IPv6 processing, the router 104 would become the host's default gateway, and the host may be configured with one or more DNS server addresses to use for its DNS queries. Therefore, as with IPv4, when the host sends outbound packets for transmission to entities on the internet 116, the host would send those packets to the router 104, the router 104 may apply NAT, and the router 104 may forward the packets on the internet 116 for routing to their destinations. Likewise, when the router 104 receives packets destined to the host, the router 104 would route those packets within the LAN to the host.

As noted above, the present disclosure also provides for causing the streaming meter 110 to be inserted as an alternate gateway for one or more hosts 106 on the LAN, so that the traffic of each such host could flow through the streaming meter 110 and the streaming meter 110 could monitor the traffic and report to the media-measurement platform 122 to facilitate media measurement. Here too, it would be useful to enable the streaming meter 110 to engage in metering that includes (i) detecting when a host engages in communication with particular domains such as streaming media service provider domains or web server domains for instance, which the streaming meter 110 may determine by monitoring DNS queries from the host, and (ii) metering the extent of the host's communication with such domains, e.g., monitoring the duration of streaming media flowing to the device on a per domain basis, among other possibilities.

In order to cause a host to route its DNS queries and other packet traffic through the streaming meter 110, under IPv6, the streaming meter 110 can send its own RA message in response to the host's RS message. The streaming meter's RA message can direct the host to use the streaming meter 110 as the host's default gateway so that the host will route its outbound traffic through the streaming meter 110. Further, the streaming meter's RA message can provision the host with DNS server addresses that are homed at the streaming meter 110 (i.e., IP addresses assigned to the streaming meter 110), so that DNS queries by the host would go to the streaming meter 110 and the streaming meter 110 could forward those queries to actual DNS servers and accordingly return DNS responses to the host similar to the arrangement discussed above.

Given the presence of both the router 104 and the streaming meter 110 on the panelist's LAN, however, a technical issue that is likely to occur in practice is that both the router 104 and the streaming meter 110 will respond to the host's RS message. Namely, (i) the host would receive an RA message from the router 104, which would direct the host to use the router 104 as its default gateway, and which may provision the host with DNS addresses or may set the O-option to direct the host to engage in stateless-DHCPv6 so as to get DNS addresses from a DHCPv6 server and (ii) the host would also receive an RA message from the streaming meter 110, which would direct the host to use the streaming meter 110 as its default gateway, and which may provision the host with one or more DNS addresses homed at the streaming meter 110.

As presently contemplated, the streaming meter 110 can perform at least two operations to help overcome this technical issue. First, the streaming meter 110 can set the priority level of the streaming meter's RA message, e.g., the priority level of the options specified in the streaming meter's RA message, as a highest possible priority level, which is likely to prioritize the streaming-meter-specified options over those specified in the router's RA message. Second, the streaming meter 110 can also send a spoofed router RA message, i.e., an RA message that purports to come from the router 104, with the spoofed RA message specifying the RA message's lifetime as zero and the RA message's priority level as a lowest possible priority level. When the host receives this spoofed RA message with lifetime=0, that may have the effect of denouncing the router's actual RA message. The host may therefore then use the options in the streaming meter's RA message instead, which should have the desired effect to facilitate metering.

A further technical issue in some situations, however, relates to the permanence of DNS settings. In some systems, once a device on a network has been provisioned with DNS addresses, the device may keep those DNS settings even if the device then receives another RA that specifies other DNS settings. With the present process, the host is likely to receive the router's actual RA message before the host receives the spoofed router RA message from the streaming meter 110, since the network path between the host and the router 104 is likely shorter than the network path between the host and the streaming meter 110. If the router's actual RA message has the option-O flag set and the host responds to that flag being set by querying a DHCPv6 server and gets DNS addresses before the device receives the streaming meter's spoofed router RA message to denounce the router's actual RA message, it may therefore be too late; the host would then already be provisioned with DNS addresses per the stateless DHCPv6 process, and the host may not switch its DNS addresses to those specified thereafter by the streaming meter's own RA message.

A technical solution to this further issue is to have the streaming meter 110 send its spoofed router RA message to the host fast enough. Namely, the streaming meter 110 could beneficially send its spoofed router RA message to the host in time for the host to receive the spoofed router RA message before the host engages in stateless DHCPv6 DNS provisioning according to the router's actual RA message. Testing has shown that the streaming meter 110 may have on the order of 0.5 second after the host receives the router's actual RA message with option-O set, in which to have the host receive the streaming meter's spoofed router RA message. By having the streaming meter 110 send its spoofed router RA message quickly enough after the streaming meter 110 receives the host's RS message, the streaming meter 110 may therefore prevent the host from engaging in stateless DHCPv6 according to the router's actual RA message. This may also then give the streaming meter more time in which to then send to the host the streaming meter's own RA message that will configure the host as desired.

In an alternative scenario, the router's actual RA message may not have the option-O flag set (and may also not have set another flag (namely, option-M) to trigger use of DHCP in full) but may instead explicitly specify DNS server addresses for the host to use. In that case, the streaming meter's spoofed router RA message with lifetime=0 may not only have the effect of denouncing the router's actual RA message but may also have the effect of undoing (deleting) the explicit DNS settings that were specified by the router's actual RA message. However, to additionally cover this scenario, the streaming meter 110 could specify lifetime=0 for each DNS server setting in the spoofed router RA message as well, to help ensure that the DNS settings that were specified by the router's actual RA message get undone.

FIG. 4 is a flow chart illustrating a method that a streaming meter could carry out in accordance with the present disclosure to facilitate measuring of media exposure, for instance with respect to an IPv6 network.

As shown in FIG. 4, at block 400, a streaming server on a LAN could configure a host device on the LAN to use the streaming meter as a default gateway of the host device rather than using a router on the LAN as the default gateway of the host device, with the configuring comprising (i) the streaming server transmitting to the host device, in response to an RS message from the host device, a spoofed RA message that purports to come from the router and that has a lifetime of zero and a first priority level and (ii) the streaming meter transmitting to the host device, in response to the RS message from the host device, an actual RA message that has a second priority level higher than the first priority level and that sets the host device to use the streaming meter as the default gateway of the host device.

At block 402, the method then includes the streaming meter monitoring network traffic of the host device that flows through the streaming meter due to the streaming meter being configured as the default gateway of the host device. Further, at block 404, the method includes the streaming meter reporting the monitored network traffic to a media-measurement platform to facilitate media-exposure measurement based on the monitored traffic.

In line with the discussion above, the host device in this method as well could be a media-presentation device such as but not limited to one of those noted above.

Further, as discussed above, the transmitting of the spoofed RA message that purports to come from the router and that has the lifetime of zero and the first priority level could result in a denouncing a RA message that the router sent in response to the RS message.

Still further, as discussed above, the RA message that the router sent in response to the RS message could include a set option-O flag that directs the host device to request DNS server assignment, and the act of transmitting the spoofed RA message to the host device could involve transmitting the spoofed RA message to the host device in time for the host device to receive the spoofed router RA message before the host device requests DNS-server assignment in response to the set option-O flag.

Further, as discussed above, the actual RA message could further set the host device to use at least one DNS address at the streaming meter, and the monitored network traffic could then include at least one DNS query. And still further, as discussed above, the spoofed RA message could further set DNS-server-assignment lifetime to zero, to help undo any express DNS-server assignment by the router's RA message As additionally discussed above, the first priority level in this method could be a lowest priority level allowed for RA messages, and the second priority level in this method could be a highest priority level allowed for RA messages.

Additional Implementations

As additionally noted above, the present disclosure also contemplates a streaming meter or other computing system configured as described above for instance to carry out various operations disclosed herein when the streaming meter is enabled on a LAN, including for instance the operations described with respect to FIGS. 3 and 4.

Further, the present disclosure also contemplates non-transitory data storage (e.g., one or more storage components, such as flash, optical, magnetic, ROM, RAM, EPROM, EEPROM, etc.) having stored thereon program instructions executable by at least one processor of a streaming meter to cause the streaming meter to carry out various operations disclosed herein when the streaming meter is enabled on a LAN, including for instance the operations described with respect to FIGS. 3 and 4.

Exemplary embodiments have been described above. Those skilled in the art will understand, however, that changes and modifications may be made to these embodiments without departing from the true scope and spirit of the invention.

What is claimed is:

1. A method to facilitate measuring of media exposure, the method comprising:

configuring, by a streaming meter on a local area network (LAN), a host device on the LAN to use the streaming meter as a default gateway of the host device, wherein the configuring comprises (a) acquiring, by the streaming meter, assignment from a router on the LAN of all Internet Protocol (IP) addresses assignable by the router, in order to prevent the router from functioning as a Dynamic Host Control Protocol (DHCP) server for the host device, and (b) then responding, by the streaming meter, to DHCP messaging from the host device, wherein the responding by the streaming meter to the DHCP messaging from the host device includes (i) assigning, by the streaming meter, an IP address to the host device and (ii) setting, by the streaming meter, the host device to use the streaming meter as the default gateway of the host device;

monitoring, by the streaming meter, network traffic of the host device that flows through the streaming meter due to the streaming meter being configured as the default gateway of the host device; and reporting, by the streaming meter, the monitored network traffic to a media-measurement platform to facilitate media-exposure measurement based on the monitored traffic.

2. The method of claim 1, wherein the host device comprises a media-presentation device.

3. The method of claim 1, wherein acquiring, by the streaming meter, assignment from the router of all IP addresses assignable by the router includes (i) identifying each of one or more IP addresses currently assigned by the router and (ii) signaling to the router to cause release of the one or more IP addresses to facilitate acquiring assignment from the router of each of the one or more IP addresses.

4. The method of claim 1, wherein acquiring, by the streaming meter, assignment from the router of all IP addresses assignable by the router results in updating at the router of a DHCP table to map each assignable IP address to a respective artificial Media Access Control (MAC) address at the streaming meter.

5. The method of claim 1, wherein the DHCP messaging from the host device includes a DHCP DISCOVER message transmitted by the host device, to which the router would not respond due to the acquiring, by the streaming meter, assignment from the router of all IP addresses assignable by the router.

6. The method of claim 1, wherein acquiring, by the streaming meter, assignment from the router of all IP addresses assignable by the router includes acquiring by the streaming meter assignment from the router of a given IP address that the router had assigned to the host device, the method further comprising:

engaging by the streaming meter in DHCP signaling with the router to cause the router to release assignment of the given IP address from the host device; and then acquiring assignment by the streaming meter from the router of the given IP address.

7. The method of claim 6, further comprising, (i) after the engaging by the streaming meter in the DHCP signaling with the router to cause the router to release assignment of the given IP address from the host device and (ii) before assigning by the streaming meter an IP address to the host device and setting by the streaming meter the host device to use the streaming meter as the default gateway of the host device:

updating, by the streaming meter, an Address Resolution Protocol (ARP) table at the router to map the given IP address to a Media Access Control (MAC) address of the host device.

8. The method of claim 7, wherein updating, by the streaming meter, the ARP table at the router to map the given IP address to the MAC address of the host device comprises:

broadcasting by the streaming meter an ARP REQUEST that requests a MAC address corresponding with the given IP address and that specifies the router as a sender of the ARP REQUEST, wherein the ARP REQUEST causes the host device to respond to the router, as the sender of the ARP request, with an ARP REPLY specifying as the MAC address corresponding with the given IP address an actual MAC address of the host device, and wherein the router accordingly updates the ARP table.

9. The method of claim 1, wherein the responding by the streaming meter to the DHCP messaging from the host device further includes setting the host device to use at least one Domain Name Server (DNS) address at the streaming meter, wherein the monitored network traffic includes at least one DNS query.

10. The method of claim 1, wherein the streaming meter performs the configuring in response to the streaming meter being enabled on the LAN.

11. The method of claim 1, wherein acquiring, by the streaming meter, assignment from a router on the LAN of all IP addresses assignable by the router includes setting a lease-lifetime of each of the IP addresses to a minimum duration.

12. The streaming meter of claim 11, wherein the responding to the DHCP messaging from the host device further includes setting the host device to use at least one Domain Name Server (DNS) address at the streaming meter, wherein the monitored network traffic includes at least one DNS query.

13. A streaming meter comprising:

a network communication interface;

at least one processor;

non-transitory data storage; and program instructions stored in the non-transitory data storage and executable by the at least one processor to cause the streaming meter to carry out operations when the streaming meter is enabled on a local area network (LAN), the operations including:

configuring a host device on the LAN to use the streaming meter as a default gateway of the host device, wherein the configuring comprises (a) acquiring assignment from a router on the LAN of all Internet Protocol (IP) addresses assignable by the router, in order to prevent the router from functioning as a Dynamic Host Control Protocol (DHCP) server for the host device, and (b) then responding to DHCP messaging from the host device, wherein the responding to the DHCP messaging from the host device includes (i) assigning an IP address to the host device and (ii) setting the host device to use the streaming meter as the default gateway of the host device, monitoring network traffic of the host device that flows through the streaming meter due to the streaming meter being configured as the default gateway of the host device, and reporting the monitored network traffic to a media-measurement platform to facilitate media-exposure measurement based on the monitored traffic.

14. The streaming meter of claim 13, wherein the host device comprises a media-presentation device.

15. The streaming meter of claim 13, wherein acquiring assignment from the router of all IP addresses assignable by the router includes (i) identifying each of one or more IP addresses currently assigned by the router and (ii) signaling to the router to cause release of the one or more IP addresses to facilitate acquiring assignment from the router of each of the one or more IP addresses.

16. The streaming meter of claim 13, wherein acquiring assignment from the router of all IP addresses assignable by the router results in updating at the router of a DHCP table to map each assignable IP address to a respective artificial Media Access Control (MAC) address at the streaming meter.

17. The streaming meter of claim 13, wherein the DHCP messaging from the host device includes a DHCP DISCOVER message transmitted by the host device, to which the router would not respond due to the streaming meter acquiring assignment from the router of all IP addresses assignable by the router.

18. The streaming meter of claim 13, wherein acquiring assignment from the router of all IP addresses assignable by the router includes acquiring assignment from the router of a given IP address that the router had assigned to the host device, the operations further including:

engaging in DHCP signaling with the router to cause the router to release assignment of the given IP address from the host device; and then acquiring assignment from the router of the given IP address.

19. The streaming meter of claim 18, wherein the operations further include, (i) after the engaging in the DHCP signaling with the router to cause the router to release assignment of the given IP address from the host device and (ii) before assigning an IP address to the host device and setting the host device to use the streaming meter as the default gateway of the host device:

updating an Address Resolution Protocol (ARP) table at the router to map the given IP address to a Media Access Control (MAC) address of the host device, wherein updating the ARP table at the router to map the given IP address to the MAC address of the host device includes (i) broadcasting an ARP REQUEST that requests a MAC address corresponding with the given IP address and that specifies the router as a sender of the ARP REQUEST, wherein the ARP REQUEST causes the host device to respond to the router, as the sender of the ARP request, with an ARP REPLY specifying as the MAC address corresponding with the given IP address an actual MAC address of the host device, and wherein the router accordingly updates the ARP table.

20. Non-transitory data storage having stored thereon program instructions executable by at least one processor of a streaming meter to cause the streaming meter to carry out operations when the streaming meter is enabled on a local area network (LAN), the operations including:

configuring a host device on the LAN to use the streaming meter as a default gateway of the host device, wherein the configuring comprises (a) acquiring assignment from a router on the LAN of all Internet Protocol (IP) addresses assignable by the router, in order to prevent the router from functioning as a Dynamic Host Control Protocol (DHCP) server for the host device, and (b) then responding to DHCP messaging from the host device, wherein the responding to the DHCP messaging from the host device includes (i) assigning an IP address to the host device and (ii) setting the host device to use the streaming meter as the default gateway of the host device;

monitoring network traffic of the host device that flows through the streaming meter due to the streaming meter being configured as the default gateway of the host device; and reporting the monitored network traffic to a media-measurement platform to facilitate media-exposure measurement based on the monitored traffic.

21. The non-transitory data storage of claim 20, wherein acquiring assignment from the router of all IP addresses assignable by the router includes acquiring assignment from the router of a given IP address that the router had assigned to the host device, the operations further including:

engaging in DHCP signaling with the router to cause the router to release assignment of the given IP address from the host device;

then acquiring assignment from the router of the given IP address; and after the engaging in the DHCP signaling with the router to cause the router to release assignment of the given IP address from the host device and before assigning an IP address to the host device and setting the host device to use the streaming meter as the default gateway of the host device, updating an Address Resolution Protocol (ARP) table at the router to map the given IP address to a Media Access Control (MAC) address of the host device, wherein updating the ARP table at the router to map the given IP address to the MAC address of the host device includes (i) broadcasting an ARP REQUEST that requests a MAC address corresponding with the given IP address and that specifies the router as a sender of the ARP REQUEST, wherein the ARP REQUEST causes the host device to respond to the router, as the sender of the ARP request, with an ARP REPLY specifying as the MAC address corresponding with the given IP address an actual MAC address of the host device, and wherein the router accordingly updates the ARP table.

22. The non-transitory data storage of claim 20, wherein the responding to the DHCP messaging from the host device further includes setting the host device to use at least one Domain Name Server (DNS) address at the streaming meter, wherein the monitored network traffic includes at least one DNS query.

\* \* \* \* \*